April 27, 1965 C. W. GEER 3,181,027

MULTIPLE BEAM FLAT COLOR TELEVISION TUBE AND SWEEP SYSTEM THEREFOR

Filed Jan. 14, 1963 5 Sheets-Sheet 1

INVENTOR.

CHARLES WILLARD GEER

BY HIS ATTORNEYS

HARRIS, KIECH, RUSSELL & KERN

INVENTOR
CHARLES WILLARD GEER
BY HIS ATTORNEYS
HARRIS, KIECH, RUSSELL & KERN

April 27, 1965 C. W. GEER 3,181,027

MULTIPLE BEAM FLAT COLOR TELEVISION TUBE AND SWEEP SYSTEM THEREFOR

Filed Jan. 14, 1963 5 Sheets-Sheet 3

INVENTOR.

CHARLES WILLARD GEER

BY HIS ATTORNEYS

HARRIS, KIECH, RUSSELL & KERN

INVENTOR.
CHARLES WILLARD GEER
BY HIS ATTORNEYS
HARRIS, KIECH, RUSSELL & KERN

April 27, 1965 C. W. GEER 3,181,027

MULTIPLE BEAM FLAT COLOR TELEVISION TUBE AND SWEEP SYSTEM THEREFOR

Filed Jan. 14, 1963

5 Sheets-Sheet 5

INVENTOR.

CHARLES WILLARD GEER

BY HIS ATTORNEYS

HARRIS, KIECH, RUSSELL & KERN

United States Patent Office 3,181,027

Patented Apr. 27, 1965

3,181,027

MULTIPLE BEAM FLAT COLOR TELEVISION TUBE AND SWEEP SYSTEM THEREFOR

Charles Willard Geer, Los Angeles, Calif., assignor to Video Color Corporation, Los Angeles, Calif., a corporation of Minnesota Filed Jan. 14, 1963, Ser. No. 251,167
21 Claims. (Cl. 315—13)

This invention relates to cathode ray tubes of the flat type such as is shown in the U.S. patent to Aiken, No. 2,795,731, and in particular to multigun flat-type cathode ray tubes and sweep systems therefor and methods of operating multigun tubes.

Cathode ray tubes are notoriously bulky and considerable effort has been expended in developing tubes and other display devices having a flat or booklike configuration. It is an object of the present invention to provide a new and novel flat-type multigun cathode ray tube which is especially adapted for use as a color television picture tube. A further object of the invention is to provide such a tube which may incorporate two or more guns with the beams from all guns directed to a single viewing screen or plate. An additional object is to provide such a tube in which two or more of the beams may be directed into a zone smaller than the resolving power of the normal eye to provide a composite image. Another object is to provide such a tube in which two or more of the beams may be directed into separated zones to provide independent images.

It is an object of the invention to provide a flat-type multigun cathode ray tube with the viewing screen having a plurality of different color-producing surfaces and with the beam from each gun directed to impinge a particular color-producing surface to produce a plurality of overlying monochrome images resulting in a polychrome picture for the viewer.

It is a particular object of the invention to provide a new and novel sweep system for a multigun cathode ray tube. Another object is to provide such a sweep system including a sheet having a plurality of parallel ridges on one face, a plurality of elongate deflection plates aligned with the ridges and exposed in a plane substantially parallel to the sheet, means for directing a first modulatable electron beam along a path in the zone between the sheet and deflection plates, means for directing a second modulatable electron beam in the opposite direction along a path in the zone between the sheet and deflection plates, means for scanning the beams over the sheet in a first coordinate direction, and sweep voltage generating means coupled to the deflection plates for developing a sweep voltage on successive plates to deflect the beams to impinge said sheet for scanning the beams over the sheet in a second coordinate direction to form a raster.

It is a further object of the invention to provide such a sweep system incorporating two sets of elongate deflection plates with the sheet positioned therebetween and including means for directing one or more electron beams into the zone between the sheet and one set of plates and one or more electron beams into the zone between the sheet and the other set of plates, with the sweep voltage generating means coupled to both sets of plates in parallel. Another object is to provide such a sweep system incorporating an additional set of deflection plates positioned along a path defining the first coordinate direction, means for directing electron beams along this path in both directions, and sweep voltage generating means coupled to this set of deflection plates for developing a sweep voltage on successive plates to deflect beams along a path in the zone between the sheet and the elongate deflection plates for scanning the beams over the sheet in the first coordinate direction.

It is a particular object of the invention to provide a new and novel sweep voltage generating means for handling electron beams directed toward each other along a common path to deflect said beams in the same direction and to scan said beams across the sheet to form the raster. A further object is to provide such a sweep voltage generating means having a plurality of output terminals connected to successive deflection plates for cyclically generating a symmetrical negative voltage pulse at successive plates with the pulse having a sloping rise and decay such that the pulse voltage exists on several adjacent plates at one time as the peak pulse value scans the plates. An additional object of the invention is to provide various unique circuits for generating the desired travelling voltage pulse.

It is an object of the invention to provide a multiple gun cathode ray tube including an envelope having a translucent viewing face and a spaced relatively parallel face with opposing ends and opposing sides enclosing an evacuated space, a translucent display sheet positioned within the envelope between the envelope faces and having a plurality of parallel ridges on each face thereof, a first set of deflection plates positioned within the envelope along a first path parallel to the ridges and spaced from one face of the sheet adjacent one edge thereof and operable to deflect electron beams from the first path to a fifth path perpendicular thereto, a second set of deflection plates positioned within the envelope along a second path parallel to the ridges and spaced from the one face adjacent the opposite edge of the sheet and operable to deflect electron beams from the second path to the fifth path, a third set of deflection plates positioned within the envelope along a third path parallel to the ridges and spaced from the opposite face of the sheet adjacent the one edge and operable to deflect electron beams from the third path to a sixth path perpendicular thereto, a fourth set of deflection plates positioned within the envelope along a fourth path parallel to the ridges and spaced from the opposite face adjacent the opposite edge and operable to deflect electron beams from the fourth path to the sixth path, a fifth set of elongate deflection plates aligned with the ridges and carried on the inner surface of the viewing face and operable to deflect electron beams from the fifth path to impinge the sheet, a sixth set of elongate deflection plates aligned with the ridges and carried on the inner surface of the parallel face of the envelope and operable to deflect electron beams from the sixth path to impinge the sheet, and a plurality of electron guns carried in the envelope for directing electron beams along any of the first, second, third and fourth paths in either direction. A further object is to provide such a tube in which one or more of the electron guns, sets of deflection plates, or parallel ridges may be omitted depending upon the particular application for the tube.

It is an object of the invention to provide a new and novel method of operating a multigun cathode ray tube to provide a raster with the tube having a viewing screen and a plurality of elongate deflection plates and including the steps of directing a first beam along a path between the screen and deflection plates and substantially perpendicular to the axes of the deflection plates, directing a second beam along the path in the opposite direction, cyclically scanning the beams across the screen in the direction of the deflection plate axes, providing a gap in the path by deflecting both beams away from the plates to impinge the screen and cyclically scanning the path gap across the screen in the direction of the path.

The invention also comprises novel details of construction and novel combinations and arrangements of parts, which will more fully appear in the course of the following description. The drawings merely show and the description merely describes preferred embodiments of the present invention which are given by way of example.

Figures 1, 2, 3:
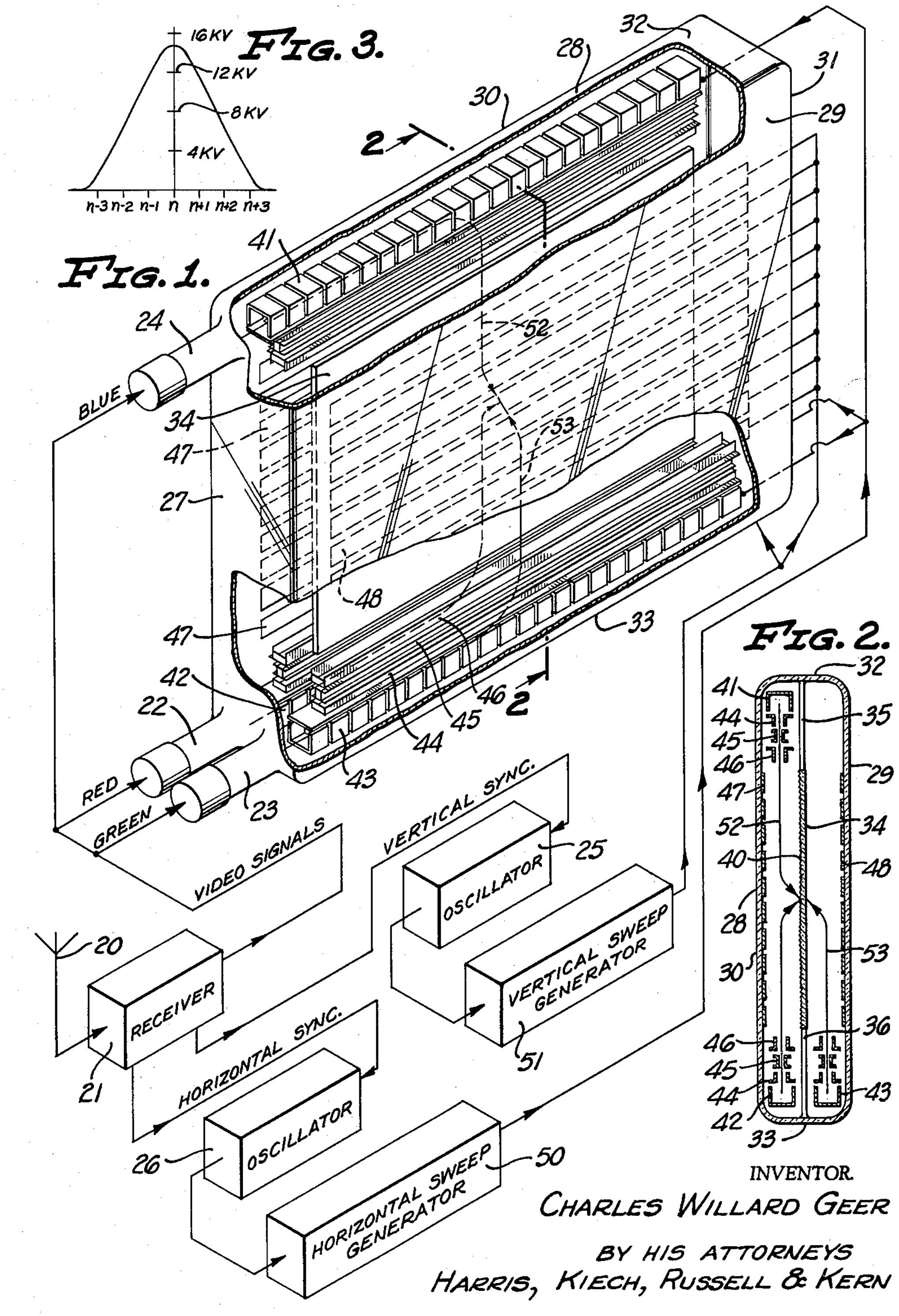
FIG. 1 is a diagrammatic presentation of a preferred embodiment of the invention.
FIG. 2 is a sectional view taken along the line 2—2 of FIG. 1.
FIG. 3 is a graphical representation of a preferred form of travelling voltage pulse for the deflection plates.

The invention is illustrated in FIG. 1 as used with a conventional color television receiving set. The radio frequency signal at an antenna 20 is directed to a receiver 21 which produces the red, blue and green video signals for modulating the beams from the red, blue and green electron guns 22, 23, 24, and the vertical and horizontal synchronization signals for the vertical and horizontal oscillators 25, 26.

The guns 22, 23, 24 are mounted at an end 27 of an envelope 28 of the cathode ray tube, the envelope comprising substantially parallel faces 29, 30, opposing ends 27, 31, and top and bottom sides 32, 33, with one of the faces serving as the viewing face. A translucent plate or sheet 34 is positioned within the envelope between the faces 28, 29 by suitable means as by ribs 35, 36.

A plurality of parallel ridges 40 is formed on one surface of the plate 34 with the spacing between ridges preferably being less than the resolving power of the normal eye. The upwardly facing surfaces of the ridges are coated with a phosphor or electroluminescent material capable of producing a blue light when excited by an electron beam. The downwardly facing surfaces of the ridges are coated with a similar material capable of producing a red light. The opposite or smooth surface of the plate is coated with a material capable of producing a green light. While the ridges are shown herein as providing continuous surfaces, the term "ridges" is also intended to include various discontinuous forms so long as the resultant effect is an upwardly facing surface and a downwardly facing surface. The construction and operation of such sheets and various modifications thereof are described in detail in my Patent No. 2,480,848 and reference may be made thereto for additional information.

A set of deflection plates 41 is positioned in the envelope along a horizontally disposed path on one side of and adjacent the upper edge of the plate 34. A similar set of deflection plates 42 is positioned in the envelope along another horizontally disposed path on the one side of and adjacent the lower edge of the plate 34. A third set of deflection plates 43 is positioned in the envelope along a horizontally disposed path on the other side of and adjacent the lower edge of the plate 34. Focusing and accelerating electrodes 44, 45, 46 may be associated with each set of deflection plates. A set of elongate deflection plates 47 is carried on the inner surface of the face 30 of the envelope and a similar set of deflection plates 48 is carried on the inner surface of the face 29, with the axes of the plates parallel to the ridges 40 of the sheet 34. Typically the plates 47, 48 are in the form of transparent electrically conducting strips applied directly to the envelope. The construction of deflection plates, various modification of the plates, and the method of operating the plates to control a single electron beam are described in the aforementioned patent to Aiken, No. 2,795,731, and reference may be made thereto for additional information.

The oscillator 26 provides an output, normally a sawtooth waveform, to a horizontal sweep generator 50 with the output of the generator being connected in parallel to the sets of deflection plates 41, 42, 43. Similarly, the oscillator 25 provides an output to a vertical sweep generator 51 with the generator output being connected in parallel to the sets of deflection plates 47, 48. The horizontal sweep generator 50 provides a negative voltage signal which travels along the deflection plates from left to right as viewed in FIG. 1 to provide the horizontal sweep. Similarly, the vertical sweep generator 51 provides a voltage signal which travels along the deflection plates from bottom to top to provide the vertical sweep. The direction of motion of the horizontal and vertical sweeps and the sweep frequencies are arbitrary and are selected to correspond with the transmitted signal to appropriately reproduce the image.

The blue gun 24 produces an electron beam along a horizontal path past the deflection plates 41 until the beam is deflected downward along a vertical path 52. The red gun 22 produces an electron beam along a horizontal path past the plates 42 until the beam is deflected upward along the path 52. The green gun 23 produces an electron beam along a horizontal path past the deflection plates 43 until the beam is deflected upward along a path 53 parallel to the path 52. The horizontal sweep voltage applied to the sets of plates 41, 42, 43 causes the paths 52, 53 to be cyclically scanned horizontally across the plate 34.

The beam from the blue gun travels downward along the path 52 until it is deflected toward the plate 34 to impinge an upwardly facing surface of one of the ridges 40. The beam from the red gun travels upward along the path 52 until it is deflected by a voltage on the set of plates 47 to impinge a downwardly facing surface of one of the ridges. Similarly, the beam from the green gun moves upward along the path 53 until it is deflected by a voltage on the set of plates 48 to impinge the opposite surface of the plate 34. When used as a color television receiver tube, the three beams will be directed to impinge within a zone or area less than the resolving power of the normal eye so that the three monochrome images produced by the three beams when appropriately modulated will blend into a single polychrome image for the viewer.

While various deflection voltage signals may be utilized to deflect an electron beam from a path, some of which are shown in the aforesaid Aiken patent, a number of problems are encountered in controlling two beams travelling along the same path as occurs in multigun tubes and the present invention contemplates the generation and use of a unique voltage signal for energizing the deflection plates of the sweep system to produce the raster. The pulse is symmetrical and has a slope for rise and decay such that the deflecting voltage exists on several adjacent plates at one time to suitably deflect the beam to impinge the plate. It is preferred to have the beam impinge the ridge face at approximately forty-five degrees to the plane of the plate. The peak value of the voltage pulse is sufficient to cause impingement of the beams on the plate while the peak width is sufficient to prevent crossing of the beams prior to impingement. A preferred form of the voltage pulse is shown in FIG. 3 with the peak value at deflection plate *n*.

A typical tube might utilize a twelve-inch square viewing plate with thirteen vertical deflection plates in each set spaced about one centimeter and each about one centimeter wide, and with seventeen horizontal deflection plates in each set spaced about one-eighth inch with each about three-quarters inch long. The deflection plates will extend beyond the viewing plate to reduce the adverse fringe effects. Using a beam with a 1500 volts accelerator in the gun and a 15,000 volts anode, the peak deflection pulse voltage on the horizontal plates would be about 1500 volts and the peak deflection pulse voltage on the vertical plates would be about 15,000 volts. The sweep rate is matched to that of the pickup tube or transmitter.

The pulse is illustrated and described as symmetrical for rise and decay. Actually, the rise and decay pulse forms may be irregular or nonsymmetrical provided that the bending effect on the electron beams produced by the rising and decaying voltage waves are the same. The angle of bend of an electron in a field is a function of the integral of the deflection force acting on the electron resulting from the voltage gradient of the field through which the electron is travelling for the period of time the electron is within the field. The value of this integral for the rise and decay halves of the voltage pulse should be the same and this is most easily achieved by utilizing a symmetrical pulse. However, the pulse may incorporate intentional or unintentional irregularities and still provide the symmetrical bending effect for beams from both directions. It is in this sense that the term symmetrical is used in describing the pulse in the specification and claims.

The same voltage pulse waveform may be used with the horizontal sweep generator and the horizontal deflection plates with the magnitude and peak width modified to provide a ninety-degree bend, although it is not necessary for the embodiment of FIG. 1 since the horizontal paths do not have electron beams travelling in two directions therealong. A number of circuits suitable for generating the deflection voltages are described hereinbelow.

Figure 4:
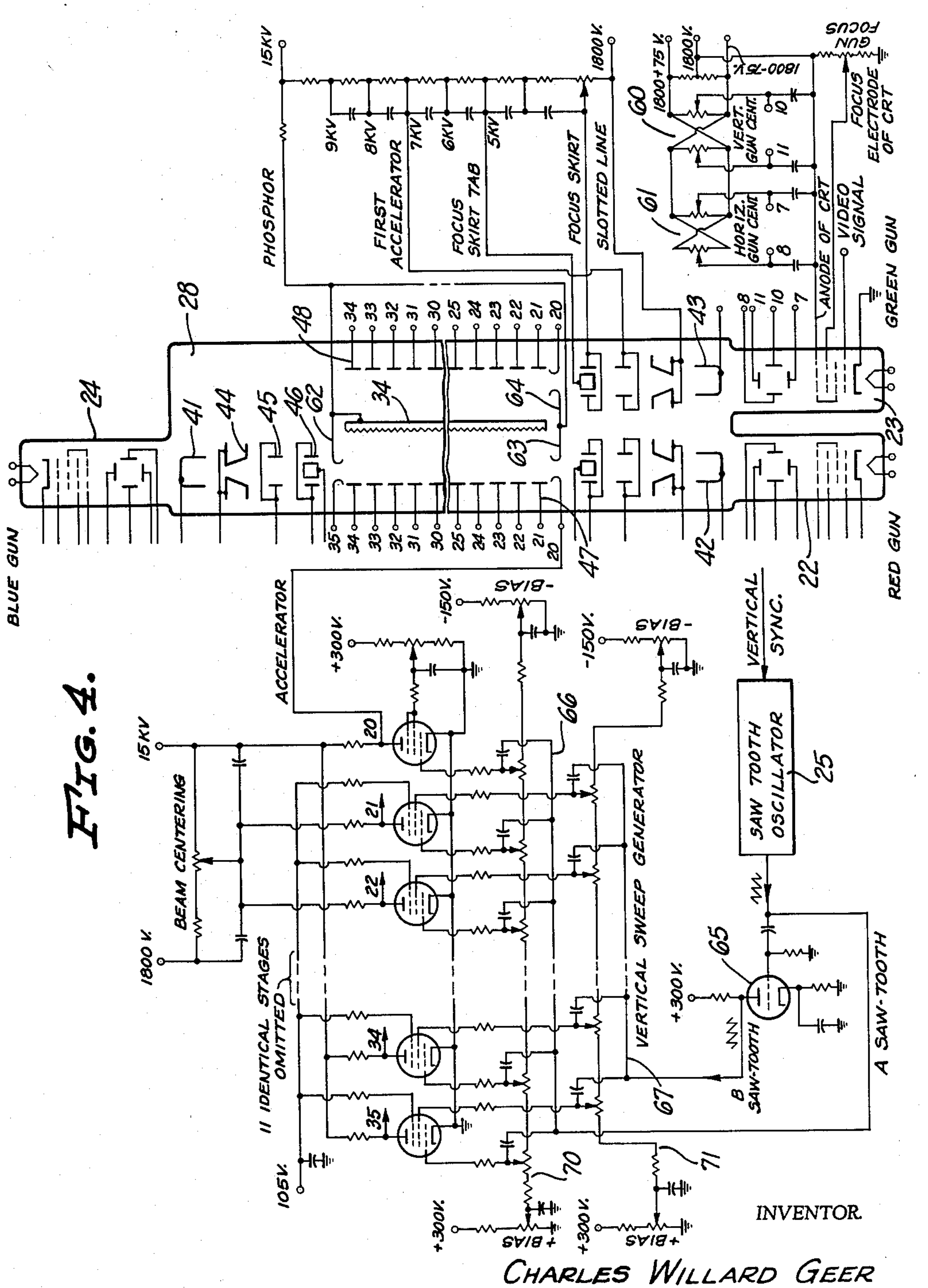
FIG. 4 is a schematic diagram of a preferred form of sweep voltage generating circuit.

FIG. 4 illustrates the tube of FIG. 1 with appropriate voltage supply circuitry and a sweep generator circuit for driving the vertical deflection plates 47, 48. A similar sweep generator circuit can be used for driving the horizontal deflection plates 41, 42, 43.

The envelope 28 is shown in a developed form. In the actual physical embodiment, the guns would project upward from the paper for directing an electron beam into the paper. The three guns are conventional in design and the voltage supply circuit shown associated with the green gun will be repeated for the red and blue guns. The green gun may include a heater connection, a cathode connected to circuit ground, a control grid for beam modulation via the video signal, a pair of accelerating anodes with the focus electrode positioned therebetween, and two pairs of centering electrodes. The variable outputs from centering controls 60, 61 are connected to the centering electrodes with the correspondingly numbered terminals directly connected.

A series of horizontal deflection plates 43 are connected to successive output terminals of the horizontal sweep generator in the same manner as will be described for the vertical deflection plates and generator. The electrodes 44, 45, 46 associated with the horizontal deflection plates are connected to the high voltage supply as indicated. The peak voltage from the power supply is connected to the plate 34 and to anodes 62, 63, 64.

The oscillator 25 produces an output in the form of a sawtooth voltage wave, referred to as the A sawtooth, which is connected to the grid of an inverter stage 65 and to line 66. Another voltage wave that is the inverse of the A sawtooth is produced at the plate of the inverter stage 65, this wave being referred to as the B sawtooth and being connected to a line 67. The oscillator 25 is maintained in synchronism with the transmitted signal by the vertical synchronization signal from the receiver.

The terminals for the vertical deflection plates are indicated by numerals 21 through 34. The sweep generator includes a plurality of amplifier stages, with a stage for each vertical deflection plate and an additional stage for the accelerator anodes at terminals 20, 35. A first voltage divider 70 including a series of potentiometers provides a bias for one control electrode of each amplifier stage and a second voltage divider 71 including a series of potentiometers provides a bias for a second control electrode of each stage. The plates of each amplifier stage are connected to corresponding anodes and deflection plates of the tube as indicated by corresponding numbers 20 through 35, with the two sets of deflection plates being connected in parallel. The A sawtooth on the line 66 is connected to each of the one control electrodes through coupling capacitors. Similarly, the B sawtooth on the line 67 is connected to the second control electrode of each stage through coupling capacitors. As indicated, the vertical deflection plates are energized from the 15,000 volts supply and type 6IT6 or VX65 vacuum tubes may be used in the amplifier stages. The horizontal deflection plates may typically be energized from a 1500 volts power supply and the corresponding sweep generator circuit may utilize type 6AN5 tubes. A beam centering control as illustrated may be utilized at the beam entering area for each electron beam if desired.

The sweep generator circuit of FIG. 4 will provide the negative voltage pulse having a form described above at each deflection plate with the pulse cyclically scanning or moving along the deflection plates to vertically sweep all of the beams across the plate 34. A similar circuit coupled to the horizontal deflection plates will provide the moving voltage pulse for horizontally sweeping the beams. As indicated previously, the particular pulse waveform produced by this generator circuit is not required for the horizontal sweep of this particular tube as the tube does not utilize two beams travelling in opposite directions along a single path in the horizontal axis.

Figures 5, 6:
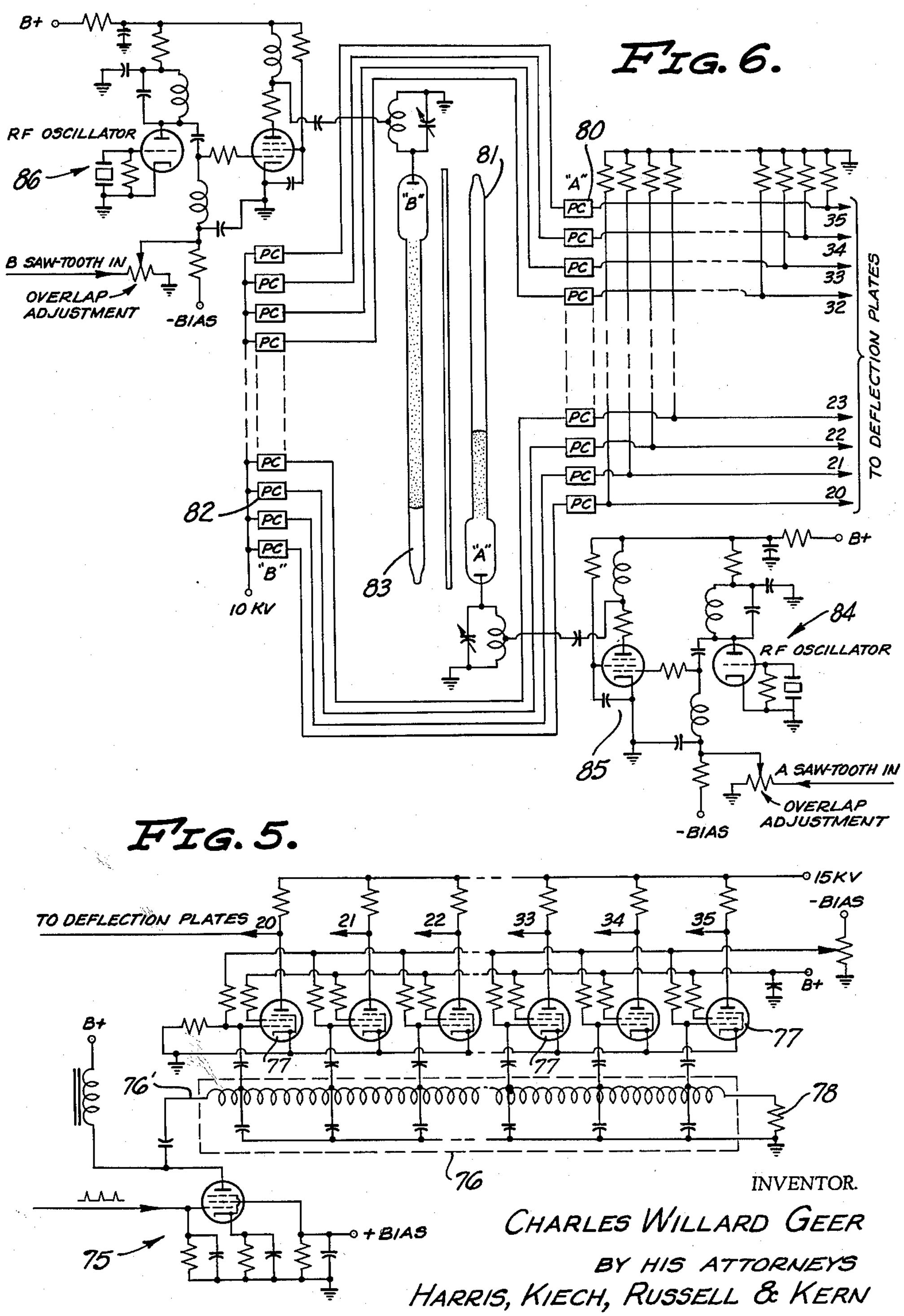
FIGS. 5–11 are diagrams of alternative forms of sweep voltage generating circuits.

FIG. 5 illustrates an alternative circuit for the sweep generator and includes an amplifier stage 75, a tapped delay line 76, and a plurality of high voltage amplifier tubes 77. A sharp pulse wave from the oscillator is amplified in the stage 75 and connected as the input at 76' to the delay line. The delay line is terminated by a suitable impedance 78 and the taps of the delay line are connected to the control grids of successive high voltage amplifier tubes such as type 6IT6. The anodes of successive tubes are connected to corresponding deflection plates for coupling the travelling voltage pulse to the cathode ray tube. For the horizontal deflection plates which do not require a high voltage, the tubes 77 may be omitted with the delay line taps connected directly to the deflection plates. Preferably the delay line will have an attenuation of less than five percent and an impedance of about 20,000 ohms. Other forms of delay lines such as acoustical lines utilizing piezo electric crystals can also be utilized.

FIG. 6 illustrates another embodiment of the sweep generator utilizing a pair of gas glow tubes or lamps energized by radio frequency voltages with the length of the glow in the lamp proportional to the magnitude of the energizing voltage. A first series of photocells or photosensitive resistors 80 is arranged in a row for illumination from a glow tube 81 and a second series of photocells 82 is arranged for illumination from a glow tube 83. Photocells from each set are connected in series between a voltage source and circuit ground, with an output terminal for connection to a deflection plate. Illumination of both resistors of a serially connected pair at the same time provides a change in impedance in the circuit and a change in voltage at the associated deflection plate. The tube 81 is energized from a radio frequency oscillator 84 that is modulated in an ampifier stage 85 by the A sawtooth wave. Similarly, the tube 83 is energized from another radio frequency oscillator 86 that is modulated by the B sawtooth wave. The overlap of the illumination from the two tubes may be controlled by the physical positioning of the components or by voltage adjustments in the circuits or by varying the phase of the two sawtooth inputs, to provide adjustment of the shape of the output voltage pulse.

Figure 7:
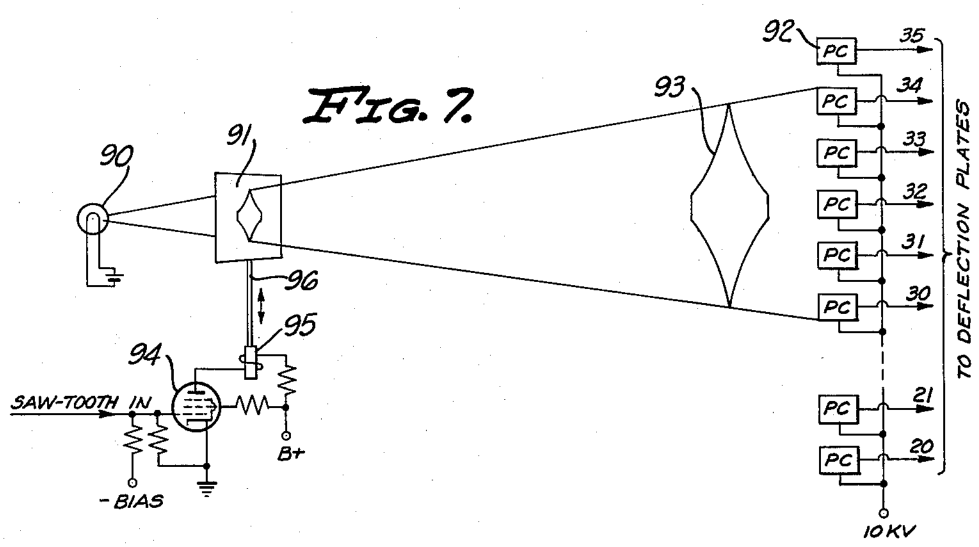

FIG. 7 illustrates another alternative form of the sweep generator incorporating a lamp 90, a mask 91 and a series of photocells 92 with the photocells connected between a voltage source and corresponding deflection plates and with the lamp and mask providing a beam having the shape shown at 93 for illuminating the photocells. Means are provided for scanning the beam over the photocells and thereby scanning the deflection voltage along the deflection plates. Scanning of the beam may be accomplished by moving the lamp or the mask or both and a means for moving the mask is illustrated. The sawtooth wave from the oscillator is coupled as the input to an amplifier tube 94 with the tube having a solenoid 95 as the output load. The solenoid core is coupled to the mask by a drive rod 96 for oscillating the mask in synchronism with the sawtooth wave to scan the beam over the photocells.

Figures 8, 11:
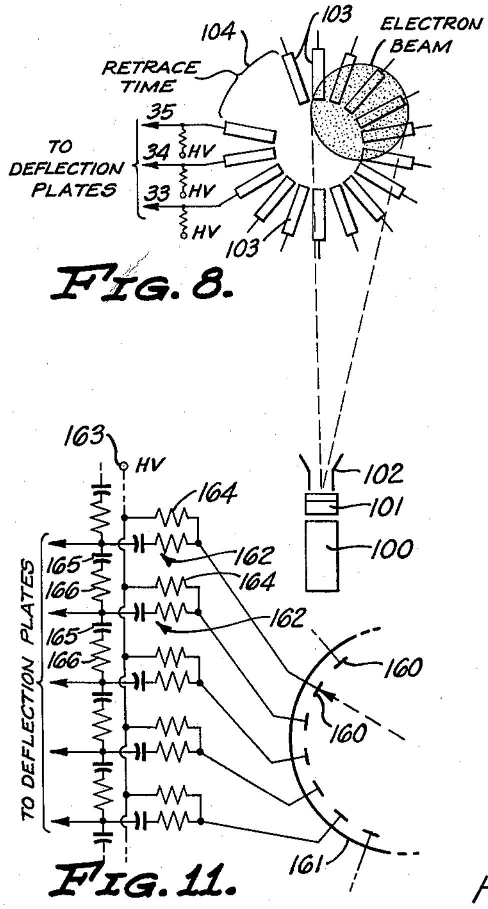

A sweep generator in the form of a cathode ray tube is shown in FIG. 8 and includes a gun 100, first and second sets of deflection plates 101, 102, and a series of anode 103 arranged in a circular pattern with each anode connected to a corresponding deflection plate. The electron beam from the gun is deflected in a circular path to scan the anodes, with the beam at the anodes of a size to overlie several anodes at one time. A conventional gun and deflection plate structure may be utilized with the circular scan obtained by providing two sine waves having a ninety-degree phase shift therebetween for the two sets of deflection plates. A gap 104 in the anode series provides for the retrace time of the sweep system. The anode shape and disposition may be varied and the shape of the electron beam may be varied to provide a precise control for the travelling voltage pulse generated at the deflection plates. In an alternative arrangement, the anodes may be disposed along a linear path and a sawtooth signal used for deflecting the electron beam.

Figure 9:
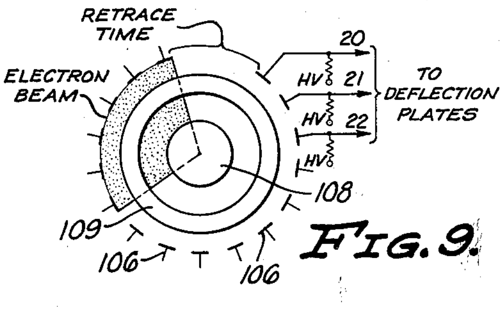
Figure 10:
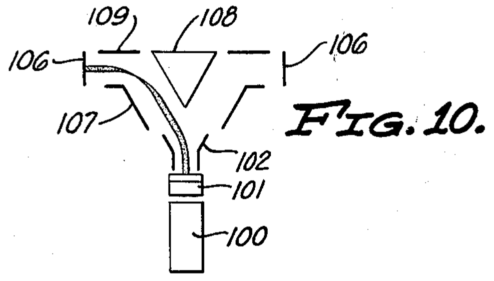
Figure 15:
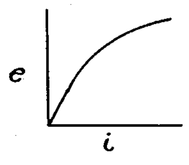
FIG. 15 is a diagram of a typical nonlinear element for use in the circuit of FIG. 11.

Another alternative arrangement for a cathode ray tube sweep generator is shown in FIGS. 9 and 10. The gun and deflection plates may be the same as that shown in FIG. 8. Anodes 106 are disposed in a ring and electrodes 107, 108, 109 deflect the beam from the gun to an anode. The deflected beam is scanned around the anodes by the deflection plates 101, 102 to scan the voltage signal across the deflection plates of the picture tube. The electron beam shape may be controlled by applying suitable voltages to the electrode to cause the beam to overlap several anodes.

FIG. 11 illustrates another type of sweep generator circuit utilizing a beam switching type of cathode ray tube. The anodes 160 of a beam switching tube 161 are connected to the deflection plates through coupling circuits 162, each coupling circuit comprising a serially connected resistor and capacitor. Each anode is fed from a high voltage terminal 163 through a resistor 164. In the beam switching tube 161, the electron beam from the gun is successively switched from each anode to the next with no overlap. A coupling circuit for forming the deflection voltage pulse and comprising a serially connected capacitor 165 and a nonlinear impedance element 166 is connected between adjacent deflection plates. Typically a varistor having a current which varies as the square or the fourth power of the applied voltage may be used as the nonlinear impedance element. When the electron beam of the switching tube is impinging a particular anode, a high voltage pulse will be produced at the corresponding deflection plate. A portion of this voltage signal will be coupled to the next preceding and following deflection plates through the varistor-capacitor coupling circuits. A much smaller proportion will be coupled to the second next preceding and second next following deflection plates through the corresponding coupling circuits. A very much smaller portion will be coupled to the third next preceding and following deflection plates, with nothing being coupled beyond. The particular proportions of voltage transferred and the number of plates covered by the transfer can be varied by suitably selecting the characteristics of the circuit components.

Figures 12, 13, 14:
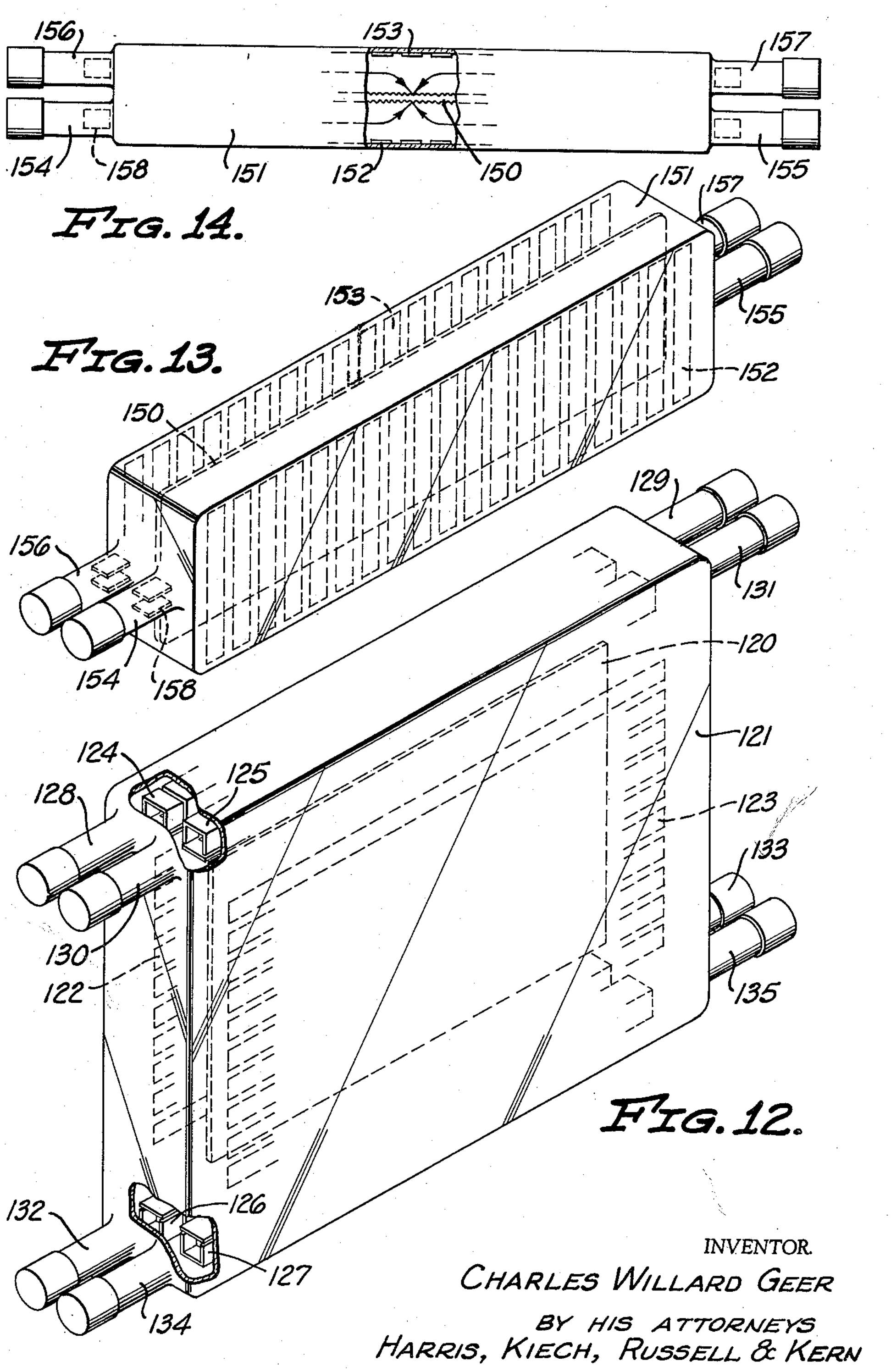
FIG. 12 is an isometric view of an alternative form of the cathode ray tube of the invention.
FIG. 13 is an isometric view of another alternative form of the cathode ray tube.
FIG. 14 is a top view of the tube of FIG. 13.

FIG. 12 illustrates an eight-gun tube that may be constructed and operated in the same manner as the three-gun tube of FIG. 1. The eight-gun tube may include a plate or sheet 120 positioned within the flat envelope 121 with the plate having a plurality of parallel ridges on each face thereof to provide four different colors for viewing. Sets of vertical deflection plates 122, 123 may be provided on the inner surface of the two faces of the envelope. Four sets of horizontal deflections plates 124, 125, 126, 127 may be provided within the envelope with guns 128, 129 positioned for directing beams along the set 124, guns 130, 131 positioned for directing beams along the set 125, guns 132, 133 positioned for directing beams along the set 126, and guns 134, 135 positioned for directing beams along the set 127.

The sweep system of the invention may be utilized to sweep all eight beams over the screen in the raster pattern while the beams are appropriately modulated to provide one or more monochrome or polychrome images as desired. For example, three beams can be used to form a polychrome image in one portion of the screen while a fourth beam is used to provide a monochrome legend or indication on the polychrome image, while the other four beams are utilized for similar purposes on another portion of the screen. Various other uses for the multigun tube will be readily apparent. Any number of separate or overlying images can be presented by suitable modulation of the various electron beams.

In the three-gun color television picture tube, the three beams are made to impinge in a very small area so as to blend the three monochrome pictures to produce a single polychrome picture for the viewer. However, it should be noted that it is not necessary to have all of the beams impinge in a single small area in the operation of the multigun tube. For example, the peak width of the sweep voltage pulse for either the horizontal sweep or the vertical sweep or both could be made any suitable width to cause impingement of the beams coming from opposite directions along the common path at spaced points on the plate with the spacing between the points controlled by the width of the pulse peak. In the conventional three-gun color tube, the raster is normally formed with all three beams on to provide a white rectangle. However, it should be noted that the raster can be formed with all beams off or with one or more beams of a multigun tube off, i.e., the sweep system may form a raster that is not visible. In certain applications of a multigun tube where only a single color or a two or three-color presentation is desired, the multicolor surfaces on either or both faces of the screen may be omitted.

Another alternative form of the multigun tube is shown in FIGS. 13 and 14, this embodiment being particularly adapted for use in the laboratory cathode ray oscilloscope which does not utilize a raster but does normally require a cyclical sweep along one axis.

A viewing plate or sheet 150 is positioned within a flat envelope 151. A set of elongate deflection plates 152, here functioning as horizontal deflection plates, is carried on the inner surface of one face of the envelope and a similar set of deflection plates 153 is carried on the inner surface of the other face of the envelope. Guns 154, 155 are positioned to direct beams into the zone between the plate 150 and plates 152 while guns 156, 157 are positioned to direct beams into the zone between the plate 150 and plates 153. A sweep generator of the type described previously provides the deflection voltage for scanning the beams in the horizontal direction. Vertical deflection of the beam from the gun 154 is produced by appropriate voltages coupled to a set of vertical deflection plates 158 in the gun. Similar sets of vertical deflection plates are provided in each of the other guns. This tube may be made a monochrome tube or a polychrome tube as desired. As shown in FIG. 14, each face of the plate 150 is provided with vertically disposed parallel ridges carrying different color producing phosphors on each set of ridge faces to provide four colors.

In an alternative arrangement, all of the guns can be positioned at one end of the tube with the elongate deflection plates spaced inward from the faces of the tube. For example, the gun 157 may be positioned at the left end of the tube to the left of the gun 156 as viewed in FIG. 13. The beam from the gun 157 would move to the right between the envelope face and the plates 153 to the right end of the tube where it would be bent one hundred eighty degrees by appropriate electrodes to travel to the left in the zone between the plate 150 and plates 153. Such an arrangement would require a thicker tube but would permit placing of the guns at one end.

The invention may also be used in various systems for generating images at different locations on the viewing screen without the use of a raster or a cyclical sweep on the vertical or horizontal axis. Single beam black and white tubes are presently being used in such an application, as in the presentation of the traffic pattern about an airport wherein images representing airplanes are plotted at various locations on the viewing screen as the airplanes are reported, with the position on the screen being determined by a computer which generates specific deflection voltages for the horizontal axis and for the vertical axis for each airplane. The tube described herein may be used in such a system to provide a color plot in a flat tube structure. The deflection voltage pulse as previously described can be used. However, instead of being cyclically swept along the deflection plates, the voltage pulse will be generated in a predetermined location and maintained at this point for a period of time as determined by the information being plotted.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

I claim as my invention:

1. In a multiple gun cathode ray tube, the combination of:

an envelope having a translucent viewing face and a spaced relatively parallel face with opposing ends and opposing sides enclosing an evacuated space;

a translucent display sheet positioned within said envelope between said envelope faces and having a plurality of parallel ridges on each face thereof;

a first set of deflection plates positioned within said envelope along a first path parallel to said ridges and spaced from one face of said sheet adjacent one edge thereof and operable to deflect electron beams from said first path to a fifth path perpendicular thereto;

a second set of deflection plates positioned within said envelope along a second path parallel to said ridges and spaced from said one face adjacent the opposite edge of said sheet and operable to deflect electron beams from said second path to said fifth path;

a third set of deflection plates positioned within said envelope along a third path parallel to said ridges and spaced from the opposite face of said sheet adjacent said one edge and operable to deflect electron beams from said third path to a sixth path perpendicular thereto;

a fourth set of deflection plates positioned within said envelope along a fourth path parallel to said ridges and spaced from said opposite face adjacent said opposite edge and operable to deflect electron beams from said fourth path to said sixth path;

a fifth set of elongate deflection plates aligned with said ridges and carried on the inner surface of said viewing face and operable to deflect electron beams from said fifth path to impinge said sheet;

a sixth set of elongate deflection plates aligned with said ridges and carried on the inner surface of said parallel face of said envelope and operable to deflect electron beams from said sixth path to impinge said sheet; and a plurality of electron guns carried in said envelope for directing electron beams along said first, second, third and fourth paths.

2. In a multiple gun cathode ray tube, the combination of:

an envelope having a translucent viewing face and a spaced relatively parallel face with opposing ends and opposing sides enclosing an evacuated space;

a translucent display sheet positioned within said envelope between said envelope faces and having a plurality of parallel ridges on at least one face thereof;

a first set of deflection plates positioned within said envelope along a first path parallel to said ridges and spaced from one face of said sheet adjacent one edge thereof and operable to deflect electron beams from said first path to a fifth path perpendicular thereto;

a second set of deflection plates positioned within said envelope along a second path parallel to said ridges and spaced from said one face adjacent the opposite edge of said sheet and operable to deflect electron beams from said second path to said fifth path;

a third set of deflection plates positioned within said envelope along a third path parallel to said ridges and spaced from the opposite face of said sheet adjacent said one edge and operable to deflect electron beams from said third path to a sixth path perpendicular thereto;

a fourth set of deflection plates positioned within said envelope along a fourth path parallel to said ridges and spaced from said opposite face adjacent said opposite edge and operable to deflect electron beams from said fourth path to said sixth path;

a fifth set of elongate deflection plates aligned with said ridges and carried on the inner surface of said viewing face and operable to deflect electron beams from said fifth path to impinge said sheet;

a sixth set of elongate deflection plates aligned with said ridges and carried on the inner surface of said parallel face of said envelope and operable to deflect electron beams from said sixth path to impinge said sheet; and a plurality of electron guns carried at one end of said envelope for directing electron beams along said first, second, third and fourth paths.

3. In a multiple gun cathode ray tube, the combination of:

an envelope having a translucent viewing face and a spaced relatively parallel face with opposing ends and opposing sides enclosing an evacuated space;

a translucent display sheet positioned within said envelope between said envelope faces and having a plurality of parallel ridges on at least one face thereof;

a first set of deflection plates positioned within said envelope along a first path parallel to said ridges and spaced from one face of said sheet adjacent on one edge thereof and operable to deflect electron beams from said first path to a fifth path perpendicular thereto;

a second set of deflection plates positioned within said envelope along a second path parallel to said ridges and spaced from said one face adjacent the opposite edge of said sheet and operable to deflect electron beams from said second path to said fifth path;

a third set of deflection plates positioned within said envelope along a third path parallel to said ridges and spaced from the opposite face of said sheet adjacent said one edge and operable to deflect electron beams from said third path to a sixth path perpendicular thereto;

a fourth set of deflection plates positioned within said envelope along a fourth path parallel to said ridges and spaced from said opposite face adjacent said opposite edge and operable to deflect electron beams from said fourth path to said sixth path;

a fifth set of elongate deflection plates aligned with said ridges and carried on the inner surface of said viewing face and operable to deflect electron beams from said fifth path to impinge said sheet;

a sixth set of elongate deflection plates aligned with said ridges and carried on the inner surface of said parallel face of said envelope and operable to deflect electron beams from said sixth path to impinge said sheet;

electron guns carried at one end of said envelope for directing electron beams along at least some of said first, second, third and fourth paths; and an electron gun carried at the opposite end of said envelope for directing an electron beam along one of said first, second, third and fourth paths in the opposite direction to the beam from said one end.

4. In a sweep system for a cathode ray tube, the combination of:

a translucent screen having a first plurality of parallel ridges on one face and a second plurality of parallel ridges on the opposite face aligned with said first ridges;

a first plurality of elongate deflection plates aligned with said ridges and disposed in a plane substantially parallel to and spaced from said one face;

a second plurality of elongate deflection plates aligned with said ridges and disposed in a plane substantially parallel to and spaced from said other face;

means for directing first and second modulatable electron beams along paths in opposite directions in the zone between said sheet and said first deflection plates;

means for directing third and fourth modulatable electron beams along paths in opposite directions in the zone between said sheet and said second deflection plates;

means for deflecting said beams over said sheet in a first coordinate direction; and sweep voltage generating means coupled to said deflection plates for developing a sweep voltage on successive plates to deflect said beams to impinge said sheet for scanning said beams over said sheet in a second coordinate direction.

5. In a multiple gun cathode ray tube, the combination of:

an envelope having a translucent viewing face and a spaced relatively parallel face with opposing ends and opposing sides enclosing an evacuated space;

a translucent display sheet positioned within said envelope between said envelope faces and having a plurlity of parallel ridges on each face thereof;

a first set of deflection plates positioned at one end of said envelope;

first means for directing electron beams past said first set in a first direction along a first path substantially perpendicular to said ridges and spaced from one face of said sheet;

a second set of deflection plates positioned at said one end of said envelope;

second means for directing electron beams past said second set in the opposite direction along a second path substantially perepndicular to said ridges and spaced from the opposite face of said sheet;

a third set of deflection plates positioned at the opposite end of said envelope;

third means for directing electron beams past said third set in the opposite direction along said first path;

a fourth set of deflection plates positioned at said opposite end of said envelope;

fourth means for directing electron beams past said fourth set in the opposite direction along said second path;

a fifth set of elongate deflection plates aligned with said ridges and carried on the inner surface of said viewing face and operable to deflect electron beams from said first path to impinge said sheet; and a sixth set of elongate deflection plates aligned with said ridges and carried on the inner surface of said parallel face of said envelope and operable to deflect electron beams from said second path to impinge said sheet.

6. In a sweep system for a cathode ray tube, the combination of:

a sheet having a plurality of parallel ridges on one face;

a plurality of elongate deflection plates aligned with said ridges and disposed in a plane substantially parallel to said sheet;

means for directing a first modulatable electron beam in a first direction along a path in the zone between said sheet and deflection plates;

means for directing a second modulatable electron beam in the opposite direction along a path in the zone between said sheet and deflection plates;

means for deflecting said beams over said sheet in a first coordinate direction;

sweep voltage generating means having a plurality of output terminals for cyclically generating a symmetrical negative voltage pulse at successive output terminals with said pulse having a sloping rise and decay such that the pulse voltage exists on several adjacent terminals at one time as the peak pulse value scans the terminals; and circuit means for connecting said output terminals to corresponding deflection plates and developing a sweep voltage on successive plates to deflect said beams to impinge said sheet for scanning said beams over said sheet in a second coordinate direction.

7. In a sweep system for a cathode ray tube, the combination of:

a translucent sheet having a plurality of parallel ridges on one face;

a first set of elongate deflection plates aligned with said ridges and disposed in a plane substantially parallel to and spaced from said one face;

a second set of elongate deflection plates aligned with said ridges and disposed in plane substantially parallel to and spaced from the other face of said sheet;

means for directing a first modulatable electron beam in a first direction along a first path in the zone between said sheet and first set of deflection plates;

means for directing a second modulatable electron beam along said first path in the opposite direction;

means for directing a third modulatable electron beam along a second path in the zone between said sheet and second set of deflection plates and parallel to said first path;

means for scanning said beams over said sheet in a first coordinate direction;

sweep voltage generating means having a plurality of output terminals for cyclically generating a symmetrical negative voltage pulse at successive output terminals with said pulse having a sloping rise and decay such that the pulse voltage exists on several adjacent terminals at one time as the peak pulse value scans the terminals; and circuit means for connecting said output terminals to corresponding deflection plates of said first and second sets in parallel and developing a sweep voltage on successive plates to deflect said beams to impinge said sheet for scanning said beams over said sheet in a second coordinate direction to form a raster.

8. In a sweep system for a cathode ray tube, the combination of:

a sheet having an electroluminescent face;

a first set of deflection plates positioned along a first path defining a first coordinate direction and lying in a plane substantially parallel to said face;

a second set of elongate deflection plates aligned with said first path and disposed in a plane substantially parallel to said face;

means for directing a first modulatable electron beam in a first direction along said first path;

means for directing a second modulatable electron beam along said first path in the opposite direction;

first sweep voltage generating means having a plurality of first output terminals for cyclically generating a symmetrical negative voltage pulse at successive output terminals with said pulse having a sloping rise and decay such that the pulse voltage exists on several adjacent terminals at one time as the peak pulse value scans the terminals;

circuit means for connecting said output terminals to corresponding deflection plates of said first set and developing a sweep voltage on successive plates to deflect said beams along a second path between said face and second set of deflection plates and perpendicular to said first path for scanning said beams over said sheet in said first coordinate direction; and second sweep voltage generating means coupled to corresponding deflection plates of said second set for developing a sweep voltage on successive plates to deflect said beams from said second path to impinge said face for scanning said beams over said sheet in a second coordinate direction to form a raster.

9. In a sweep system for a cathode ray tube, the combination of:

a sheet having a plurality of ridges on one face;

a first set of deflection plates positioned along a first path parallel to said ridges and spaced from said face adjacent one edge of said sheet;

a second set of deflection plates positioned along a second path parallel to said first path and spaced from said face adjacent the opposite edge of said sheet;

a third set of elongate deflection plates aligned with said ridges and disposed in a plane substantially parallel to said face;

means for directing a first modulatable electron beam in a first direction along said first path;

means for directing a second modulatable electron beam along said first path in the opposite direction;

means for directing a third modulatable electron beam along said second path;

first sweep voltage generating means having a plurality of first output terminals for cyclically generating a symmetrical negative voltage pulse at successive output terminals with said pulse having a sloping rise and decay such that the pulse voltage exists on several adjacent terminals at one time as the peak pulse value scans the terminals;

first circuit means for connecting said first output terminals to corresponding deflection plates of said first and second sets and developing a sweep voltage on successive plates to deflect said beams along a third path perpendicular to said first and second paths for scanning said beams over said sheet in a first coordinate direction;

second sweep voltage generating means having a plurality of second output terminals for cyclically generating a symmetrical negative voltage pulse at successive output terminals with said pulse having a sloping rise and decay such that the pulse voltage exists on several adjacent terminals at one time as the peak pulse value scans the terminals; and second circuit means for connecting said second output terminals to corresponding deflection plates of said third set and developing a sweep voltage on successive plates to deflect said beams from said third path to impinge said sheet for scanning said beams over said sheet in a second coordinate direction to form a raster.

10. In a beam deflection system for a cathode ray tube, the combination of:

a sheet having a plurality of parallel ridges on one face;

a plurality of elongate deflection plates aligned with said ridges and disposed in a plane substantially parallel to said sheet;

means for directing a first modulatable electron beam in a first direction along a path in the zone between said sheet and deflection plates;

means for directing a second modulatable electron beam in the opposite direction along a path in the zone between said sheet and deflection plates;

means for deflecting said beams over said sheet in a first coordinate direction;

deflection voltage generating means having a plurality of output terminals for generating a symmetrical negative voltage pulse with said pulse having a sloping rise and decay such that the pulse voltage exists on several adjacent terminals at one time; and circuit means for connecting said output terminals to corresponding deflection plates and developing the voltage thereon to deflect said beams to impinge said sheet for moving the impinging location over said sheet in a second coordinate direction.

11. A sweep system as defined in claim 6 in which said voltage generating means includes:

a plurality of amplifier stages operated in parallel, each of said stages having first and second control elements and an output terminal;

a first voltage divider connected across a bias voltage source and having a plurality of taps;

a second voltage divider connected across a bias voltage source and having a plurality of taps;

means for connecting said first control elements of successive stages to the taps of said first divider;

means for connecting said second control elements of successive stages to the taps of said second voltage divider;

means for generating a sawtooth voltage wave and the inverse of said wave;

means for connecting said sawtooth wave to one of said control elements of successive stages;

means for connecting said inverse wave to the other of said control elements of successive stages; and means for connecting said output terminals to corresponding deflection plates.

12. A sweep system as defined in claim 6 in which said sweep voltage generating means includes:

a delay line having an input, a plurality of taps therealong, and a terminating impedance;

means for generating a sawtooth voltage wave connected to said delay line input; and means for connecting said taps to corresponding deflection plates.

13. A sweep system as defined in claim 12 in which said means for connecting includes a plurality of high voltage amplifier tubes with a control grid of each tube connected to a corresponding delay line tap and with the anode of such tube connected to the deflection plate.

14. A sweep system as defined in claim 6 in which said sweep voltage generating means includes:

first and second gas glow tubes;

first and second radio frequency voltage sources;

means for generating a sawtooth voltage wave and the inverse of said wave;

first modulator means with an output coupled to said first glow tube in driving relation and having said first radio frequency source and said sawtooth wave as inputs for generating an oscillating light wavefront in said first tube;

second modulator means with an output coupled to said second glow tube in driving relation and having said second radio frequency source and said inverse wave as inputs for generating an oscillating light wavefront in said second tube; and a plurality of pairs of photosensitive elements, with each pair connected in series between a voltage source and a corresponding deflection plate, with an element of each pair arranged in sequence for illumination by said first tube and with the other element of each pair arranged in sequence for illumination by said second tube.

15. A sweep system as defined in claim 6 in which said sweep voltage generating means includes:

a plurality of photosensitive elements, with said elements arranged in sequence and with each element connected between a voltage source and a corresponding deflection plate;

a light source;

a mask positioned between said source and elements for illumination of said elements by a beam of light through an opening in said mask; and means for cyclically scanning said beam of light along said sequence of elements.

16. A sweep system as defined in claim 6 in which said sweep voltage generating means includes:

a cathode ray tube having an electron beam gun and a plurality of anodes arranged in sequence;

means for connecting each of said anodes to a corresponding deflection plate; and means for cyclically sweeping the beam of said gun along said sequence of anodes with said beam overlying a plurality of anodes at one time.

17. A sweep system as defined in claim 6 in which said sweep voltage generating means includes:

a cathode ray tube having an electron beam gun and a plurality of anodes arranged in sequence;

means for connecting each of said anodes to a corresponding deflection plate;

means for cyclically switching the beam of said gun from anode to anode; and a plurality of voltage coupling circuits each including a nonlinear impedance element, with a voltage coupling circuit connected between each adjacent pair of deflection plates.

18. In a sweep system for a cathode ray tube, the combination of:

a sheet having a plurality of parallel ridges on one face;

a plurality of elongate deflection plates aligned with said ridges and disposed in a plane substantially parallel to said sheet;

means for directing a first modulatable electron beam in a first direction along a path perpendicular to said ridges and in the zone between said sheet and deflection plates;

means for directing a second modulatable electron beam along said path in the opposite direction;

means for scanning said beam path over said sheet in a first coordinate direction;

sweep voltage generating means having a plurality of output terminals for cyclically generating a symmetrical negative voltage pulse at successive output terminals with said pulse having a sloping rise and decay such that the pulse voltage exists on several adjacent terminals at one time as the peak pulse value scans the terminals; and circuit means for connecting said output terminals to corresponding deflection plates and developing a sweep voltage on successive plates to deflect said beams to impinge said sheet for scanning said beams over said sheet in a second coordinate direction to form a raster.

19. In a sweep system for a cathode ray tube, the combination of:

a translucent screen having a first plurality of parallel ridges on one face and a second plurality of parallel ridges on the opposite face aligned with said first ridges;

a first plurality of elongate deflection plates aligned with said ridges and disposed in a plane substantially parallel to and spaced from said one face;

a second plurality of elongate deflection plates aligned with said ridges and disposed in a plane substantially parallel to and spaced from said other face;

means for directing first and second modulatable electron beams along paths in opposite directions in the zone between said sheet and said first deflection plates;

means for directing third and fourth modulatable electron beams along paths in opposite directions in the zone between said sheet and said second deflection plates;

means for deflecting said beams over said sheet in a first coordinate direction;

sweep voltage generating means having a plurality of output terminals for cyclically generating a symmetrical negative voltage pulse at successive output terminals with said pulse having a sloping rise and decay such that the pulse voltage exists on several adjacent terminals at one time as the peak pulse value scans the terminals; and circuit means for connecting said output terminals to corresponding deflection plates and developing a sweep voltage on successive plates to deflect said beams to impinge said sheet for scanning said beams over said sheet in a second coordinate direction.

20. In a sweep system for a flat body cathode ray tube for color television or the like, the combination of:

a translucent sheet having a plurality of parallel ridges on one face providing a series of first surfaces facing one direction and a series of second surfaces facing the opposite direction and having a third flat surface on the opposite face;

a first set of deflection plates positioned along a first path parallel to said ridges and spaced from said one face adjacent one edge of said sheet;

a second set of deflection plates positioned along a second path parallel to said first path and spaced from said one face adjacent the opposite edge of said sheet;

a third set of deflection plates positioned along a third path parallel to said first path and spaced from said other face adjacent the opposite edge of said sheet;

a fourth set of elongate deflection plates aligned with said ridges and disposed in a plane substantially parallel to and spaced from said one face;

a fifth set of elongate deflection plates aligned with said ridges and disposed in a plane substantially parallel to and spaced from said other face;

means for directing a first modulatable electron beam along said first path;

means for directing a second modultatable electron beam along said second path;

means for directing a third modultable electron beam along said third path;

first sweep voltage generating means coupled to said first, second and third set of deflection plates in parallel for developing a sweep voltage on successive plates of each set to deflect said first and second beams along a fourth path and said third beam along a fifth path, with said fourth and fifth paths perpendicular to said first, second and third paths, for scanning said beams over said sheet in a first coordinate direction;

second sweep voltage generating means having a plurality of output terminals for cyclically generating a symmetrical negative voltage pulse at successive output terminals with said pulse having a sloping rise and decay such that the pulse voltage exists on several adjacent terminals at one time as the peak pulse value scans the terminals; and circut means for connecting said output terminals to corresponding deflection plates of said fourth and fifth sets in parallel and develouing a sweep voltage on successive plates to deflect said first and second beams to impinge said one face at a small area spot and to deflect said third beam to impinge said other face at said spot for scanning said beams over said sheet in a second coordinate direction to form a raster.

21. In a sweep system for a flat body cathode ray tube for color television or the like, the combination of:

a translucent sheet having a plurality of parallel ridges on one face providing a series of first surfaces facing one direction and a series of second surfaces facing the opposite direction;

a first set of deflection plates positioned along a first path parallel to said ridges and spaced from said one face adjacent one edge of said sheet;

a second set of deflection plates positioned along a second path parallel to said first path and spaced from said one face adjacent the opposite edge of said sheet;

a third set of elongate deflection plates aligned with said ridges and disposed in a plane substantially parallel to and spaced from said one face;

means for directing a first modulatable electron beam along said first path;

means for directing a second modulatable electron beam along said second path;

first sweep voltage generating means coupled to said first and second set of deflection plates in parallel for developing a sweep voltage on successive plates of each set to deflect said first and second beams along a third path perpendicular to said first and second paths for scanning said beams over said sheet in a first coordinate direction;

second sweep voltage generating means having a plurality of output terminals for cyclically generating a symmetrical negative voltage pulse at successive output terminals with said pulse having a sloping rise and decay such that the pulse voltage exists on several adjacent terminals at one time as the peak pulse value scans the terminals; and circuit means for connecting said output terminals to corresponding deflection plates of said third set and developing a sweep voltage on successive plates to deflect said first and second beams to impinge said one face at a small area spot for scanning said beams over said sheet in a second coordinate direction to form a raster.

References Cited by the Examiner

UNITED STATES PATENTS

| | | | |
|---|---|---|---|
| 2,480,848 | 9/49 | Geer | 313—70 |
| 2,795,731 | 6/57 | Aiken | 315—21 |

DAVID G. REDINBAUGH, *Primary Examiner.*